Patented May 21, 1929.

1,714,427

UNITED STATES PATENT OFFICE.

MAX ALBERT KUNZ, OF MANNHEIM, AND KARL KÖBERLE, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

PRODUCTION OF VAT DYESTUFFS.

No Drawing. Application filed June 16, 1927, Serial No. 199,431, and in Germany March 15, 1926.

Meso-benzdianthrone, obtainable by the reduction of 1.1'-dianthraquinonyl, and also the derivatives of ms-benzdianthrone hitherto known posses an affinity for the fibre and a tinctorial power which remain far below those required in the case of vat dyestuffs. Also the tetrabrome - ms - benzdianthrone which has been produced by brominating benzdianthrone, using the most rigorous methods of working, gives from a green vat colorations which do not meet the requirements put to dyestuffs in practice.

We have now found that by treating ms-benzdianthrone and its derivatives with halogen or substances liberating halogen, at atmospheric pressure and preferably in the presence of a halogen transporter, halogen derivatives are produced, the tinctorial properties of which meet all requirements of practice. In the manner described more or less highly halogenated derivatives can be obtained.

The most valuable products obtainable according to the present invention are the trihalogen derivatives and those mono- or poly - halogenated ms - benzdianthrones which, in addition to the halogen atoms, contain one or more other substituents such as alkyl groups, alkoxy groups and others.

We do not claim in this aplication halogenated benzdianthrones free from other substituents, said compounds being claimed in a divisional application.

The following examples will further illustrate how our invention may be carried out in practice, but the invention is not limited to these examples. The parts are by weight.

Example 1.

100 parts of bromine are introduced, drop by drop, into a solution of 100 parts of ms-benzdianthrone in 1000 parts of nitrobenzene at room temperature. The mass is stirred for one hour, whereupon the temperature is raised 60° C. and stirring continued at this temperature for three further hours. The reaction product is then allowed to cool. The brownish-black crystals, which separate out, consist of the hydrobromic acid oxonium salt of dibrome-ms-benzdianthrone, from which the dibrome-ms-benzdianthrone corresponding most probably to the formula

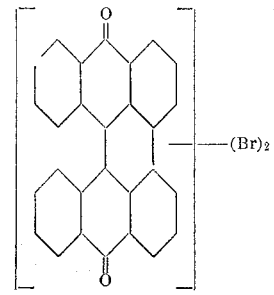

can be easily obtained, for instance by precipitation from a solution in concentrated sulfuric acid. The new coloring matter dissolves with a blue color in concentrated sulfuric acid and crystallizes from benzene in orange-yellow needles. Cotton is dyed from the green vat strong yellow shades.

Example 2.

100 parts of ms-benzdianthrone and 5 parts of iodine are dissolved in 750 parts of nitrobenzene. 200 parts of bromine are added to the solution, drop by drop, while stirring at about 100° C. As soon as all of the bromine has been added, the temperature is slowly raised to about 150–160° C. and the mixture maintained at this temperature for four hours. After cooling down, the precipitate is filtered off by suction. A brownish-yellow powder is thus obtained, which when recrystallized from nitrobenzene gives brownish-yellow needles of tribrome-ms-benzdianthrone. This substance dissolves in concentrated sulfuric acid with a bluish green color, and gives very strong golden-yellow shades on cotton.

Example 3.

150 parts of sulfuryl chlorid are added at 60° C. while stirring to a solution of 100 parts of ms-benzdianthrone in 400 to 500 parts of nitrobenzene to which about 5 parts of iodine have been added. The mixture is stirred for 6 hours at this temperature, allowed to cool, and filtered with suction. The remainder of the reaction product can be isolated from the filtered liquid by driving off the nitrobenzene by means of steam. The yield is quantitative; by recrystallization from nitrobenzene yellow needles of trichlor-ms-benzdianthrone, which dissolve in concentrated sulfuric acid with a blue color, are obtained; the product dyes cotton from the green vat strong golden-yellow shades.

*Example 4.*

150 parts of sulfuryl chlorid are added, drop by drop, at 60° C. while stirring, to a solution of 100 parts of 2.2'-dimethyl-ms-benzdianthrone in 400 to 500 parts of nitrobenzene to which about 5 parts of iodine have been added. After the stirring has been continued at this temperature for 6 hours, the reaction mixture is allowed to cool and worked up in the same way as described in Example 3. The tetrachlor-dimethyl-ms-benzdianthrone corresponding most probably to the formula

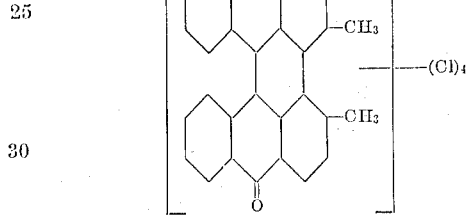

can be recrystallized from nitrobenzene to form orange colored needles. It is soluble in concentrated sulfuric acid with a blue-green color and dyes cotton from the green vat bright orange shades.

*Example 5.*

10 parts of 2.2'-dimethyl-ms-benzdianthrone are dissolved in 250 parts of sulfuric acid of 66° Bé. strength and 0.5 part of iodine is added. Dry chlorine gas is so long passed in at 100° C. until the solution which was blue at the beginning, has turned greenish-blue in color. It is then poured onto ice and filtered with suction. The chlor-dimethyl-ms-benzdianthrone thus produced forms green vats, and dyes cotton clear orange shades.

*Example 6.*

15 parts of sulfuryl chlorid are added, drop by drop, at 60° C. while stirring to a solution of 10 parts of 4.4'-dichlor-2.2'-dimethyl-ms-benzdianthrone and 0.5 part of iodine in 100 parts of nitrobenzene. The reaction mixture is maintained at this temperature for six hours. It is then cooled down and the pentachlor-2.2'-dimethyl-ms-benzdianthrone, corresponding most probably to the formula

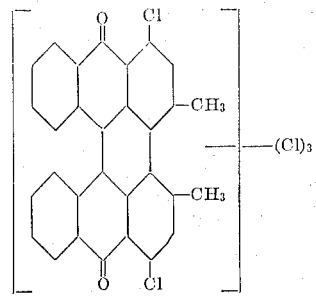

is filtered off with suction. It crystallizes in orange-red needles and dyes cotton from the green vat strong orange shades.

What we claim is:

1. The process of producing valuable vat dyestuffs which consist in halogenating a ms-benzdianthrone at atmospheric pressure.

2. As new articles of manufacture, halogenated ms-benzdianthrones containing at least one further substituent.

3. As new articles of manufacture, halogenated 2.2'-dimethyl-ms-benzdianthrones.

In testimony whereof we have hereunto set our hands.

MAX ALBERT KUNZ.
KARL KÖBERLE.